United States Patent

Okada et al.

Patent Number: 6,045,944
Date of Patent: Apr. 4, 2000

[54] BATTERY AND METHOD OF MANUFACTURING THE SAME

[75] Inventors: Naotada Okada; Masahiro Kato, both of Yokohama; Katsuhisa Homma, Yokosuka, all of Japan

[73] Assignee: Kabushiki Kaisha Toshiba, Kawasaki, Japan

[21] Appl. No.: 09/128,763

[22] Filed: Aug. 4, 1998

[30] Foreign Application Priority Data

Aug. 6, 1997 [JP] Japan ................................. 9-212032
Jan. 8, 1998 [JP] Japan ................................. 10-002417

[51] Int. Cl.[7] ........................... H01M 2/02; H01M 2/08; B23K 26/00
[52] U.S. Cl. .................... 429/163; 429/175; 429/185; 29/623.2; 219/121.63; 219/121.64
[58] Field of Search .................... 429/163, 164, 429/175, 176, 185; 29/623.1, 623.2; 219/121.63, 121.64

[56] References Cited

U.S. PATENT DOCUMENTS

| | | | |
|---|---|---|---|
| 4,117,300 | 9/1978 | Ricards | 29/623.1 X |
| 4,425,491 | 1/1984 | Batistoni et al. | 219/60.2 |
| 4,587,182 | 5/1986 | Stiles et al. | 429/94 |
| 5,397,660 | 3/1995 | Rossoll et al. | 429/163 |
| 5,879,416 | 3/1999 | Nakamura et al. | 29/623.2 |
| 5,985,478 | 11/1999 | Kim | 429/53 |

FOREIGN PATENT DOCUMENTS 9-35699  2/1997  Japan.

*Primary Examiner*—Maria Nuzzolillo
*Assistant Examiner*—Jonathan Crepeau
*Attorney, Agent, or Firm*—Oblon, Spivak, McClelland, Maier & Neustadt, P.C.

[57] ABSTRACT

There is a sealed battery including a battery case having a lid hermetically joined to the opening portion of an outer jacket, and having a structure in which an electrolyte injection hole in the battery case is hermetically sealed with a metal sealing lid. This sealed battery includes a battery case having a structure in which a metal lid is welded to the opening portion of a metal outer jacket, an electric-power generating element housed in the battery case and having a positive electrode and a negative electrode with a separator being sandwiched therebetween, an electrolyte injection hole formed in the battery case to allow an electrolyte to be injected, and a sealing lid made of a metal plate material which is seam-welded to the battery case including the electrolyte injection hole by laser welding. The sealing lid has a weld portion formed by the laser welding to have a closed loop surrounding the electrolyte injection hole so as to be seam-welded to the battery case. At least one of start and end points of the weld portion is located outside the closed loop.

20 Claims, 5 Drawing Sheets

WELD PORTION HAVING CLOSED
LOOP WITH R=1.5mm

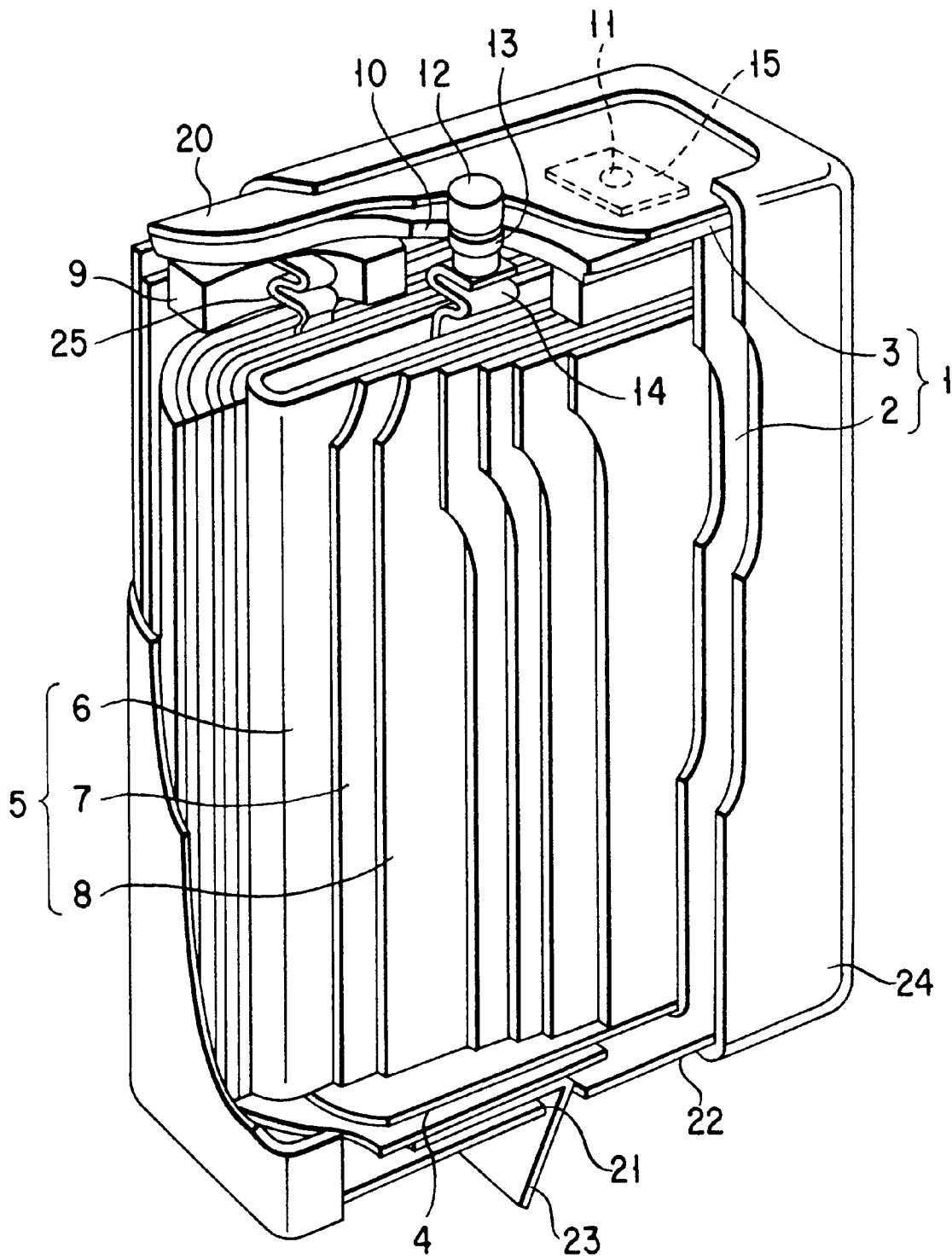
F I G. 7

BATTERY AND METHOD OF MANUFACTURING THE SAME

BACKGROUND OF THE INVENTION

The present invention relates to a sealed battery and a method of manufacturing the same and, more particularly, to a sealed battery having an improved structure for sealing an electrolyte injection hole, and a method of manufacturing the same.

Conventional sealed batteries of this type, e.g., prismatic sealed batteries, have the following structures:

(1) a sealed battery including a metal outer jacket having a prismatic shape with a bottom, an electric-power generating element housed in the outer jacket, an electrolyte injected through the electrolyte injection hole, and a metal lid welded to the opening portion of the upper end of the outer jacket and having an electrode terminal insulated by a hermetic seal;

(2) a sealed battery including a metal outer jacket having a prismatic shape with a bottom, an electric-power generating element housed in the outer jacket, an electrolyte injected through the opening portion of the outer jacket, and a metal lid joined to the opening portion of the upper end of the outer jacket by clamping and having an electrode terminal insulated by a hermetic seal; and (3) a sealed battery including a metal outer jacket having a prismatic shape with a bottom, an electric-power generating element housed in the outer jacket, a lid made of a metal plate material, welded to the opening portion of the outer jacket and having an electrode terminal insulated by a hermetic seal and an electrolyte injection hole, the electrolyte injected into the outer jacket through the electrolyte injection hole in the lid, and a spherical or hook-like plug member inserted into the electrolyte injection hole and joined by brazing or resistance welding.

According to the prismatic sealed battery having the structure (1), the lid is welded to the opening portion of the upper end of the outer jacket in an atmosphere in which the electrolyte stored in the outer jacket is evaporated. The electrolyte vapor condensed in the welding area between the outer jacket and the lid causes weld defects, resulting in a considerable deterioration in sealing properties.

According to the prismatic sealed battery having the structure (2), since the outer jacket, to which the lid is joined by clamping, has a prismatic shape with a bottom, the process conditions of clamping corner portions are different from that of clamping side portions resulting in a severe deterioration in sealing properties.

According to the prismatic sealed battery having the structure (3), the plug member is inserted into the electrolyte injection hole, and is joined by resistance welding or brazing. The plug member may undergo joining failure due to evaporation of the electrolyte. In addition, when the lid is to be formed by using aluminum to reduce the weight, it is difficult to join the plug member in the electrolyte injection hole of the lid by brazing or resistance welding.

Note that a sealed battery having an electrolyte injection hole formed in the bottom or side surface of an outer jacket also has the same problem as that posed in the batteries having the liquid injection holes in the lids because they have the same structure except for the positions of the electrolyte injection holes.

In cylindrical sealed batteries as well as prismatic sealed batteries, with the technique (1), weld defects degrade sealing properties for the same reason as that for the prismatic sealed batteries. According to the technique (2), in the case of a cylindrical sealed battery, since clamping conditions are uniform, better sealing properties can be obtained than in the case of a prismatic sealed battery. In comparison with a battery using welding, the sealing properties of this battery deteriorate during operation, especially in a high-temperature environment. With the technique (3), joining failure occurs or joining itself is difficult to perform for the same reason as that for prismatic sealed batteries.

BRIEF SUMMARY OF THE INVENTION

It is an object of the present invention to provide a battery including a battery case having a lid hermetically joined to the opening portion of an outer jacket, and having a structure in which the electrolyte injection hole of the battery case is hermetically sealed with a metal sealing lid.

It is another object of the present invention to provide a method of easily manufacturing a battery including a battery case having a lid hermetically joined to the opening portion of an outer jacket, and having a structure in which the electrolyte injection hole of the battery case is hermetically sealed with a metal sealing lid.

According to the present invention, there is provided a battery comprising:

a battery case having a structure in which a metal lid is welded to an opening portion of a metal outer jacket;

an electric-power generating element housed in the battery case and having a positive electrode and a negative electrode with a separator being sandwiched therebetween;

an injection hole formed in the battery case to allow an electrolyte to be injected; and a sealing lid made of a metal plate material which is seam-welded to the battery case including the injection hole by a laser beam, wherein the sealing lid has a weld portion formed by the laser beam to have a closed loop surrounding the injection hole to be seam-welded to the battery case, and at least one of start and end points of the weld portion is located outside the closed loop.

In addition, according to the present invention, there is provided a method of manufacturing a battery, comprising the steps of:

assembling a battery case by welding a metal lid to an opening portion of a metal outer jacket;

housing an electric-power generating element in the battery case and the element having a positive electrode and a negative electrode with a separator being sandwiched therebetween;

forming an injection hole in the battery case and injecting an electrolyte into the case through the injection hole; and placing a sealing lid made of a metal plate material on an outer surface of the battery case including the injection hole, and seam-welding the sealing lid to the battery case to seal the injection hole, wherein the seam-welding process is performed by forming a weld portion on the sealing lid by a laser beam such that the weld portion has a closed loop surrounding the injection hole and at least one of start and end points of the weld portion is located outside the closed loop.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 7 is a partially cutaway perspective view showing another prismatic sealed lithium ion secondary battery according to the present invention.

DETAILED DESCRIPTION OF THE INVENTION

A prismatic sealed battery as an example of the sealed battery of the present invention will be described in detail below with reference to the views of the accompanying drawing. In this case, "prismatic" means that a cross-section of the outer jacket, taken along a surface including the electric-power generating element, is prismatic. However, this cross-section may have rounded corner portions.

Figure 1:
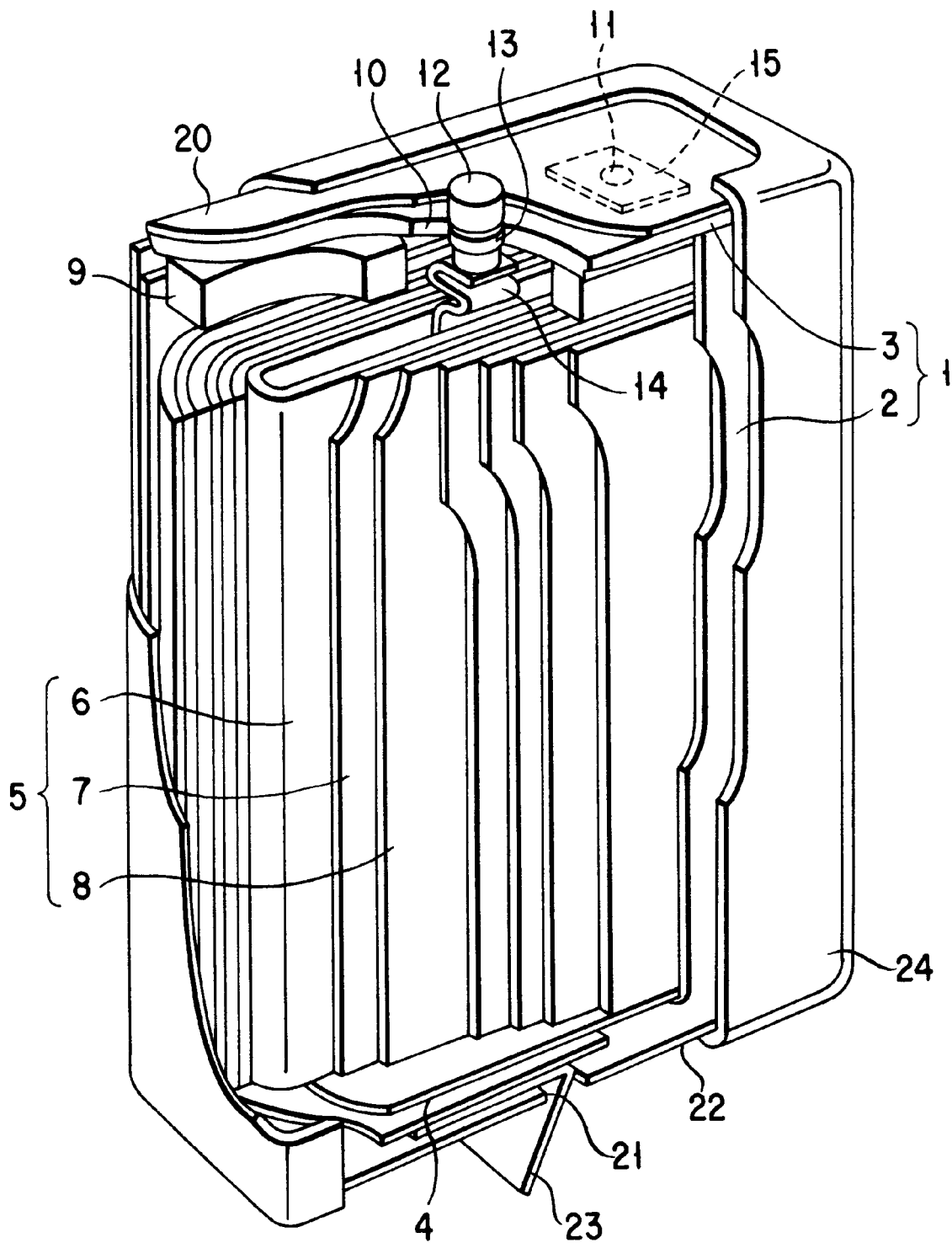
FIG. 1 is a partially cutaway perspective view showing a prismatic sealed lithium ion secondary battery as an example of the sealed battery of the present invention.
Figure 2:
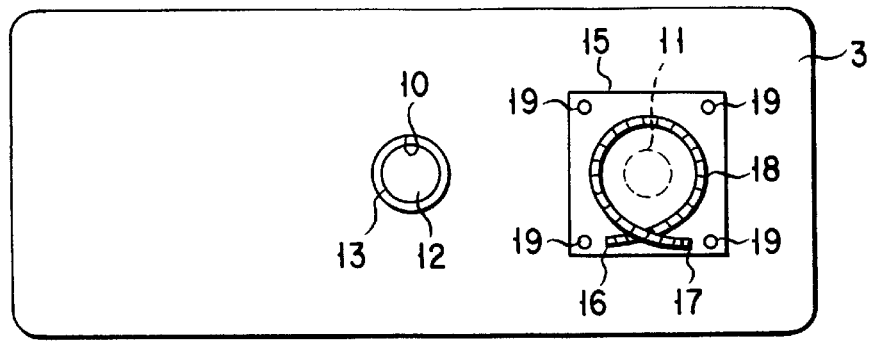
FIG. 2 is a plan view of the secondary battery in FIG. 1.

FIG. 1 is a perspective view of a sealed battery according to the present invention, e.g., a prismatic sealed lithium ion secondary battery. FIG. 2 is a plan view of the secondary battery.

A prismatic battery case 1 has a structure in which a metal lid 3 is hermetically sealed to an opening portion of a metal outer jacket 2 having a prismatic shape with a bottom by, for example, laser welding. The outer jacket 2 also serves as, for example, a positive electrode terminal. An insulating sheet 4 is formed on the inner surface of the bottom portion of the outer jacket 2.

An electrode member 5 serving as an electric-power generating element is housed in the outer jacket 2 of the battery case 1. For example, the electrode member 5 is manufactured as follows. A negative electrode 6, a separator 7, and a positive electrode 8 are spirally wounded such that the positive electrode 8 is located on the outermost circumference. The resultant structure is then pressed into a flat structure. A spacer 9 having a lead extraction hole formed near its center and consisting of a synthetic resin is placed on the electrode member 5 in the outer jacket 2.

A negative electrode terminal extraction hole 10 is formed near the center of the lid 3. A liquid injection hole 11 is formed in a portion of the lid 3 which is separated from the extraction hole 10. A negative electrode terminal 12 is sealed in the hole 10 of the lid 3 through an insulating member 13 made of a glass or resin material with a hermetic seal. A lead 14 is connected to the lower end face of the negative electrode terminal 12. The other end of the lead 14 is connected to the negative electrode 6 of the electrode member 5.

A sealing lid 15 made of a metal plate material is seam-welded to the outer surface of the lid 3 including the electrolyte injection hole 11 by a laser beam after an electrolyte is injected through the electrolyte injection hole 11 of the lid 3. More specifically, as shown in FIG. 2, a weld portion 18 having a closed loop is formed on the sealing lid 15 by performing the laser beam from a start point 16 to an end point 17 so as to draw a closed loop approximated to a circle surrounding the electrolyte injection hole 11. The sealing lid 15 is seam-welded to the lid 3 with the weld portion 18. At least one of the start point 16 and the end point 17 of the weld portion 18, e.g., both the points, is located outside the closed loop. Spot weld portions 19 are preferably formed on portions of the sealing lid 15, e.g., four corner portions, which are located outside the closed loop of the weld portion 18 before the weld portion 18 is formed.

An upper insulating sheet 20 covers the entire outer surface of the lid 3 including the sealing lid 15. A lower insulating sheet 22 having a slit 21 is placed on the bottom surface of the outer jacket 2. One surface of a folded PTC (Positive Thermal Coefficient) element 23 is interposed between the bottom surface of the outer jacket 2 and the lower insulating sheet 22. The other surface of the PTC element 23 extends outside the lower insulating sheet 22 through the slit 21. An outer tube 24 extends from a side surface of the outer jacket 2 to the peripheral portions of the insulating sheets 20 and 22 on the upper and lower surfaces of the outer jacket 2, and fixes the upper and lower insulating sheets 20 and 22 to the outer jacket 2. With this outer tube 24, the other surface of the PTC element 23 extending outward is bent toward the bottom surface of the lower insulating sheet 22.

A method of manufacturing the sealed battery according to the present invention will be described in detail next.

The insulating sheet 4 is placed on the bottom surface in the metal outer jacket 2 having a prismatic shape with the bottom, and an electric-power generating means (for example, the electrode member 5 formed by spirally winding the positive electrode 8 and the negative electrode 6 with the separator 7 being sandwiched, and pressing the resultant structure into a flat structure) is housed in the outer jacket 2. The spacer 9 having the lead extraction hole formed near its center is placed on the electrode member 5 in the outer jacket 2. Thereafter, the metal lid 3 is hermetically sealed to the upper end opening portion of the outer jacket 2 by, for example, laser welding, thereby assembling the battery case 1 having the electrode member 5 housed therein. Note that the lid 3 has an electrode terminal (negative electrode terminal 12) hermetically sealed through the insulating member 13 and the electrolyte injection hole 11 for electrolyte.

An electrolyte is injected into the outer jacket 2 through the electrolyte injection hole 11 of the lid 3. The sealing lid 15 made of a metal plate material is seam-welded to the outer surface of the lid 3 including the electrolyte injection hole 11 by laser welding to seal the electrolyte injection hole 11. More specifically, the sealing lid 15 is placed on the outer surface of the lid 3 including the electrolyte injection hole 11, and laser welding is performed from the start point 16 to the end point 17 such that a closed loop approximated to a circle surrounding the electrolyte injection hole 11 is drawn on the sealing lid 15, and at least one of the start point 16 and the end point 17, e.g., both the points, is located outside the closed loop, as shown in FIG. 2. With this laser welding, the sealing lid 15 is seam-welded to the outer surface of the lid 3 including the electrolyte injection hole 11 to seal the electrolyte injection hole 11.

As shown in FIG. 2, preferably, spot welding is performed on portions (e.g., four corner portions) of the sealing lid 15 which are located outside the weld portion 18, and the sealing lid 15 is temporarily fixed to the lid 3 with the spot weld portions 19 before the above laser welding. In addition, the lid 3 to which the sealing lid 15 is welded preferably has a surface roughness (Ra) of 3 µm or less.

The insulating sheet 20 is placed on the surface of the lid 3, and the insulating sheet 22 having the slit 21 is placed on the outer surface of the bottom portion of the outer jacket 2. In addition, the folded PTC element 23 is placed on the insulating sheet 22, and the entire resultant structure including the outer case 2 is inserted into the outer tube 24. The outer tube 24 is heat-shrunk. With this process, the upper insulating sheet 20 is attached to the lid 3, and the lower insulating sheet 22 and the PTC element 23 are attached to the bottom portion of the outer case 2. As a result, for example, a prismatic sealed battery including the prismatic sealed lithium ion secondary battery having the structure shown in FIGS. 1 and 2 is manufactured.

When the above sealed battery is a lithium ion secondary battery, the following components are used as the negative electrode, the separator, the positive electrode, and the electrolyte.

The negative electrode has a structure in which a paste containing a carbonaceous material in/from which lithium ions are absorbed/desorbed is held on the upper and lower surfaces of a current collecting element such as a thin aluminum plate.

The positive electrode has a structure in which a paste containing an active material such as a lithium-nickel oxide, a lithium-cobalt oxide, or a lithium-manganese oxide is held on the upper and lower surfaces of a current collecting element such as a thin copper plate.

As the separator, a porous film made of a synthetic resin such as polypropylene is used.

As the electrolyte, for example, a liquid obtained by dissolving an electrolytic salt such as lithium perchlorate, lithium borofluoride, lithium hexafluoride, or lithium phosphate hexafluoride in an organic solvent such as ethylene carbonate or propylene carbonate is used.

The above battery case and sealing lid are preferably made of an aluminum-based metal. As the aluminum-based metal, for example, pure aluminum or an aluminum alloy containing 0.5 wt % or less of Mg and 0.2 wt % or less of Cu is preferably used. As this aluminum alloy, for example, the alloy with the alloy number "AA1050", "AA1100", "AA1200", or "AA3003" can be used.

The lid preferably has a thickness of 0.8 mm or more, and more preferably from 0.9 to 1.5 mm. If the thickness of the lid is less than 0.8 mm, its strength is not enough to protect the electrode member housed in the outer jacket.

The sealing lid made of a metal plate member preferably has a thickness of 0.10 to 0.25 mm. If the thickness of the sealing lid is less than 0.10 mm, it is difficult to hermetically seal the electrolyte injection hole formed in the battery case (e.g., the lid) with the sealing lid. In contrast to this, if the thickness of the sealing lid exceeds 0.25 mm, it is difficult to properly seam-weld the sealing lid to the battery case (e.g., the lid) by laser welding. This may impair the hermetic sealing properties of the sealing lid for the electrolyte injection hole. More preferably, therefore, the sealing lid has a thickness of 0.1 to 0.2 mm.

The sealing lid is preferably seam-welded to the lid by laser welding under the following conditions: irradiation energy=4 to 5 J/pulse; pulse width=3 to 10 ms; overlap ratio=70 to 80%; and spot diameter of laser beam at focusing portion=0.4 to 0.5 mm.

Figure 3:
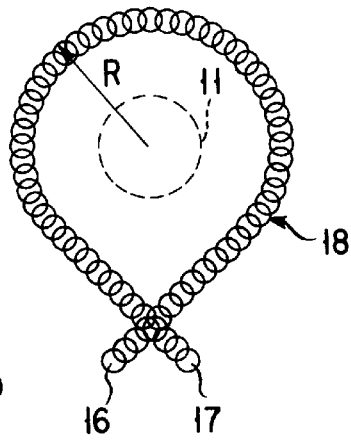
FIG. 3 is a plan view showing the minimum radius of the closed loop of a weld portion in FIG. 1.

The closed loop of the weld portion 18 surrounding the electrolyte injection hole 11 is preferably formed on the sealing lid 15 such that a minimum radius (R) of the sealed loop becomes equal to or less than 1.75 mm, as shown in FIG. 3. Note that the electrolyte injection hole 11 preferably has a radius of 5 to 1.1 mm.

Figure 5:
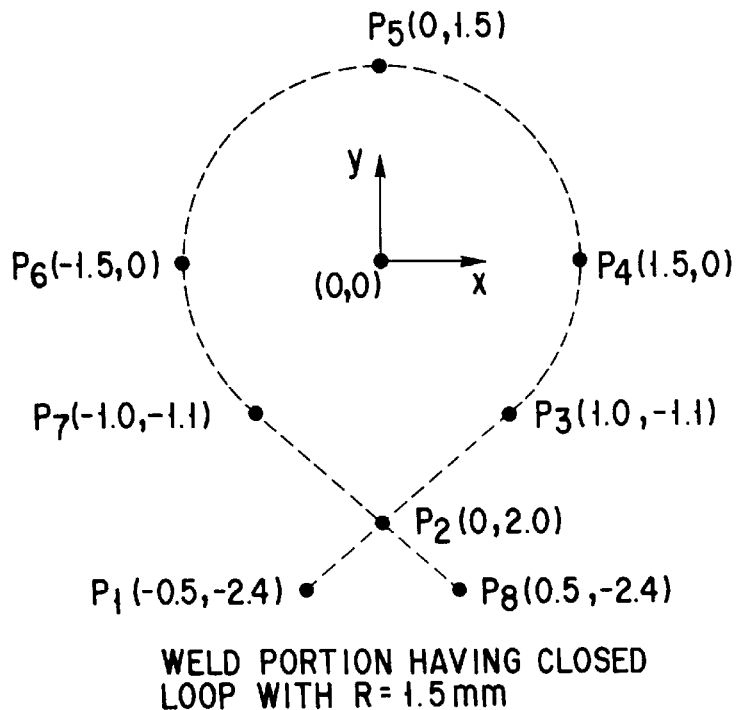
FIG. 5 is a view showing the x- and y-coordinates [P(x, y)] of points $P_1$ to $P_8$ of a weld portion when the minimum radius of a welding path is set to 1.5 mm.

In this case, the minimum radius of the closed loop of the weld portion 18 means that distortion of the arcuated shape of the weld portion 18 is allowed, as shown in FIG. 5. FIG. 5 shows x- and y-coordinates [P(x, y)] of welding path points $P_1$ to $P_8$ when the minimum radius of the closed loop of the weld portion 18 is set to 1.5 mm. The center of the welding path is represented by (0, 0).

Figures 4A, 4B:
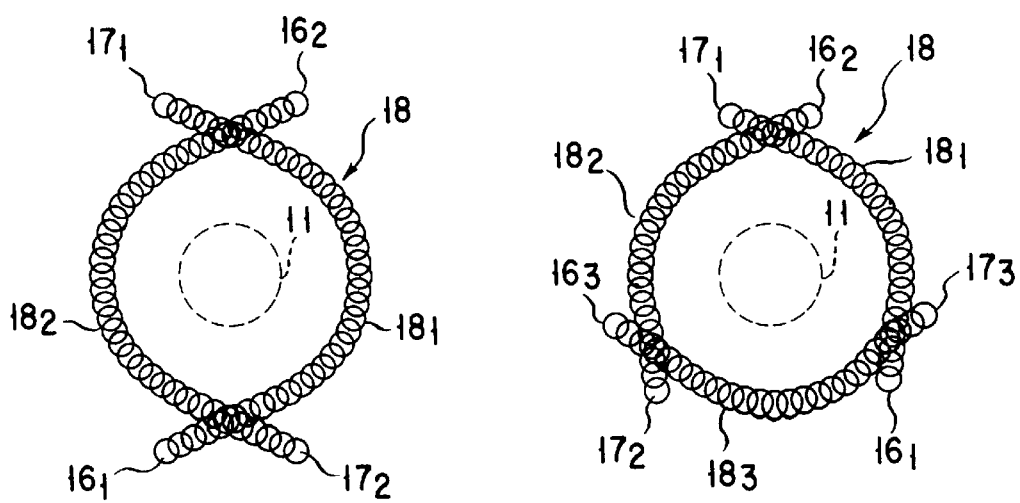
FIGS. 4A and 4B are plan views each showing a weld portion having a closed loop which is formed by dividing continuous laser welding scanning.

The weld portion having the closed loop may formed by performing laser welding scanning a plurality of number of times from start points to end points instead of performing continuous laser welding scanning once from the start point 16 to the end point 17, as shown in FIG. 3. For example, as shown in FIG. 4A, two arcuated weld portions $18_1$ and $18_2$ may be formed by performing laser welding scanning from start points $16_1$ and $16_2$ to end points $17_1$ and $17_2$, and a weld portion 18 having a closed loop may be formed by these weld portions $18_1$ and $18_2$. Alternatively, as shown in FIG. 4B, three arcuated weld portions $18_1$, $18_2$, and $18_3$ may be formed by performing laser welding scanning from start points $16_1$, $16_2$, and $16_3$ to end points $17_1$, $17_2$, and $17_3$, and a weld portion 18 having a closed loop may be formed by these weld portions $18_1$, $18_2$, and $18_3$. At least one of the start and end points, e.g., both the points, of each of the arcuated weld portions ($18_1$, $18_2$, and $18_3$) of each of the weld portions having the closed loops shown in FIGS. 4A and 4B are located outside the closed loop.

Figure 6:
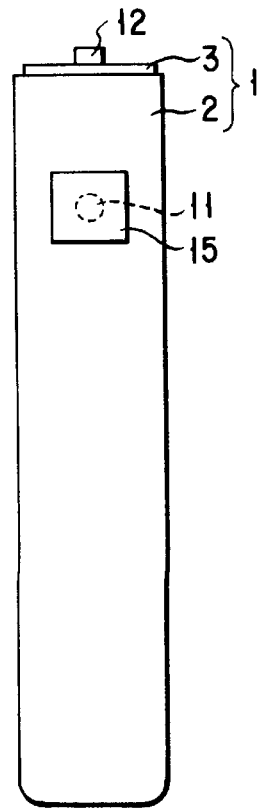
FIG. 6 is a front view showing a prismatic sealed lithium ion secondary battery having a structure in which a sealing lid is laser-welded to an outer jacket according to the present invention.

Although the electrolyte injection hole is formed in the lid 3 of the battery case 1 as shown in FIGS. 1 and 2, the sealed battery of the present invention is not limited to this. For example, as shown in FIG. 6, the electrolyte injection hole 11 may be formed in the side surface of the outer jacket 2, and the sealing lid 15 may be seam-welded to the side surface of the outer jacket 2 including the electrolyte injection hole 11 by laser welding. Alternatively, the electrolyte injection hole 11 may be formed in the bottom surface of the outer jacket 2 of the battery case 1, and the sealing lid 15 may be seam-welded to the side surface of the outer jacket 2 including the electrolyte injection hole 11.

The structure shown in FIG. 7 may be used to electrically join the outer jacket 2 and the electrode member 5 to each other. More specifically, the separator 7 is located on the outermost circumference of the electrode member 5, and a positive electrode lead 25 extends from the positive electrode 8 of the electrode member 5 to the lid 3 to be welded to the surface of the lid 3 which is located on the electrode member 5 side. With this structure, since the lid 3 and the outer jacket 2 are electrically joined to each other by welding, the outer jacket 2 and the positive electrode 8 of the electrode member 5 can be electrically joined to each other through the lid 3.

The above sealed battery may have the following structure. The electrode member is housed in the outer jacket such that the negative electrode is located outside the outer jacket. The outer jacket serves as a negative electrode terminal. The electrode terminal hermetically sealed by the lid serves as a positive electrode terminal.

The sealed battery according to the present invention is not limited to a prismatic sealed battery. For example, the present invention can be equally applied to a cylindrical sealed battery that differs only in shape from the prismatic sealed battery but has the same basic structure.

According to the sealed battery of the present invention described above, when the sealing lid is to be seam-welded to the outer surface of the battery case (e.g., the lid) including the liquid injection hole by laser welding after the electrolyte is injected through the electrolyte injection hole, at least one of the start and end points of the weld portion is located outside the closed loop.

According to this structure, the effect of the electrolyte is minimized. The electrolyte can be condensed both on the inner surface of the electrolyte injection hole and top surface of the battery case. The electrolyte on the inner surface of the electrolyte hole does not disturb the welding since it is apart from the weld portion. The electrolyte on the top surface of the battery case can easily be removed by wiping, causing no effect to the welding. In addition, since the closed loop of the weld portion between the battery case and the sealing lid is formed to surround the electrolyte injection hole, the electrolyte injection hole can be hermetically sealed with the sealing lid. Furthermore, since weld defects due to the presence of the start and end points of laser welding on the weld portion and formation of pinholes due to redundant welding can be prevented, the electrolyte injection hole can be sealed with the sealing lid more hermetically. Therefore, a sealed battery with high sealing properties (hermeticity) can be obtained.

Alternatively, the sealing lid may be temporarily fixed to the battery case including the electrolyte injection hole by spot-welding the sealing lid to the battery case at positions outside the closed loop of the weld portion before the battery case and the sealing lid are seam-welded to each other. After this temporary fixing, the sealing lid can be seam-welded to the battery case. As a result, the electrolyte injection hole is sealed more hermetically.

If the minimum radius (R) of the closed loop of the weld portion 18, which surrounds the electrolyte injection hole 11, is set to 1.75 mm or less, the absolute length of the weld portion 18 can be decreased. As a result, the heat input during welding for forming the weld portion 18 can be reduced. This can prevent the electrolyte from evaporating and escaping from the electrolyte injection hole 11 through the spacer 9.

In addition, if a plurality of arcuated weld portions are formed by laser scanning from start points to end points to form a weld portion having a closed loop, as shown in FIGS. 4A and 4B, the heat input during welding for each scanning operation can be reduced. This can prevent the electrolyte from evaporating and escaping from the electrolyte injection hole 11 through the spacer 9.

Even if the battery case and the sealing lid are made of pure aluminum or an aluminum-based metal such as an aluminum alloy, these members can be properly joined to each other by seam-welding the sealing lid by laser welding so as to seal the electrolyte injection hole. Therefore, the electrolyte injection hole can be hermetically sealed with the sealing lid, and the weight of the sealed battery can be reduced with the use of the aluminum-based metal.

Conventionally, resistance welding, ultrasonic welding, and brazing have been used for joining a lid having an electrolyte injection hole to the opening portion of the upper end of an outer jacket and sealing the electrolyte injection hole after injection of an electrolyte through the electrolyte injection hole. Though resistance welding is suited to steel materials, it is not suitable to joining aluminum materials. To perform brazing, the temperature of a base member must be raised high, and a flux is required. It is therefore difficult to apply brazing to a battery containing chemicals such as an electrolyte. Aluminum is one of the hardest-to-braze materials. Though the ultrasonic welding is suited for the spot welding of aluminum-based materials, it is difficult to be used for welding for hermetic sealing. In addition, when a lid is integrally formed with an outer jacket, the welding area cannot be directly held by a welding jig in consideration of the shape of the structure. This makes it difficult to perform reliable welding.

According to the present invention, since the sealing lid is seam-welded to the outer surface of the battery case (e.g., the lid) including the electrolyte injection hole by a laser beam, even if the sealing lid and the battery case are made of an aluminum-based material, they can properly be joined to each other.

The above aluminum alloy is in general inferior to pure aluminum in laser weldability. If, however, this alloy contains 0.05 wt % or less of Mg and 0.2 wt % or less of Cu, laser welding can be performed relatively easily. Laser welding goes through a process in which the metals at the weld portion between the two members are heated to be fused and mixed, and then cooled to solidify. If the alloy contains certain amounts or more of chemical components (Mg and Cu in this case) which differ in solidifying points or thermal expansion/shrinkage relatively greatly, stress concentrates on the weld portion during cooling/ solidification, resulting in cracks in the weld portion. That is, so-called solidification cracking occurs. This solidification cracking greatly depends on the Mg and Cu contents. In the present invention, with the use of an aluminum alloy containing 0.05 wt % or less of Mg and 0.20 wt % or less of Cu, the sealing lid can be easily joined to the battery case so as to seal the electrolyte injection hole by laser welding.

A highly reliable sealed battery can therefore be obtained, which has a structure in which an electrolyte injection hole is hermetically sealed after injection of an electrolyte. If the battery case and the sealing lid are made of an aluminum-based metal, in particular, a lightweight sealed battery can be obtained without impairing the sealing properties of the battery case.

According to the method of the present invention, a sealing lid made of a metal plate is placed on a battery case including an electrolyte injection hole, and laser welding is performed across the sealing lid and the battery case. As a result, a portion of the battery case is fused in the form of a deep recess, forming a so-called keyhole. Laser welding can therefore be performed in the form most resistant to solidification cracking.

A highly reliable sealed battery can therefore be manufactured, which has a structure in which an electrolyte injection hole is hermetically sealed properly after injection of an electrolyte.

In laser welding for the above sealing lid, the formation of a weld portion having a closed loop surrounding the electrolyte injection hole, with at least one of the start and end points of the weld portion being located outside the closed loop, can minimize the chance of re-welding portions on the sealing lid at which weld marks having different reflection absorption coefficients or weld defects tend to be produced. The welding state tends to become unstable at the start and end points, in particular, and hence weld defects tend to be produced. By locating at least one of the start and end points outside the closed loop of the weld portion, the sealing properties of the sealing lid can be protected against formation of pinholes and lack of penetration in the portions of the sealing lid at which these points are located. This can reduce the weld defects and realize highly reliable sealing of the electrolyte injection hole.

In this case, if the sealing lid is temporarily fixed to the battery case by performing spot welding in areas of the sealing lid which are located outside the closed loop, e.g., corner portions, before the above laser welding, the gap between the sealing lid and the battery case to which the sealing lid is to be joined can be reduced to, for example, ½ or less the thickness of the sealing lid. In addition, since temporary fixing eliminates the necessity to press the sealing lid in seam welding, deformation of the battery case in the above joining process can be minimized. As a result, laser welding can be automated, and hermetic sealing defects in laser welding can be reduced.

Furthermore, if the surface roughness of the battery case to which the sealing lid is to be joined is set to 3 $\mu$m or less, the seal joining strength between the battery case and the sealing lid can be further increased.

The preferred embodiments of the present invention will be described in detail below with reference to the prismatic sealed battery shown in FIGS. 1 to 3.

EXAMPLE 1

First of all, an insulating sheet 4 was placed on the bottom surface of an outer jacket 2 having a prismatic shape with a bottom and consisting of aluminum (AA alloy number "3003"), and an electrode member 5 formed by spirally winding a positive electrode 8 and a negative electrode 6 with a separator 7 being sandwiched therebetween, and pressing the resultant structure into a flat structure was housed in the outer jacket 2. A spacer 9 having a lead extraction hole formed near its center was then placed on the electrode member 5 in the outer jacket 2. Thereafter, a 1.0 mm thick lid 3 consisting of aluminum (AA alloy number "3003") was hermetically joined to the opening portion of the upper end of the outer jacket 2 by laser welding. Note that the lid 3 has a negative electrode terminal 12, hermetically sealed through an insulating member 13, and a liquid injection hole 11 for an electrolyte.

A nonaqueous-solvent-based electrolyte obtained by dissolving a lithium hexafluoride electrolytic salt in ethylene carbonate and methyl ethyl carbonate was injected into the outer jacket 2 through the electrolyte injection hole 11. A sealing lid 15 made of an aluminum (AA alloy number "3003") plate material having a length of 5 mm, a width of 5 mm, and a thickness of 0.20 mm was placed on the outer surface of the lid 3 including the electrolyte injection hole 11. As shown in FIG. 2, spot welding was performed on four corner portions of the sealing lid 15, and the sealing lid 15 was temporarily fixed to the lid 3 with spot weld portions 19.

Subsequently, laser welding was performed for the sealing lid 15 under the following conditions: irradiation energy=5.0 J/Pulse; pulse width=5.0 ms; repetition frequency=24 Hz; and overlap ratio=75%. With this welding, a weld portion 18 was formed such that a closed loop surrounding the electrolyte injection hole 11 was drawn in the process of scanning from a start point 16 to an end point 17, and both the start and end points were located outside the closed loop. With this process, the sealing lid 15 was seam-welded to the lid 3 to seal the electrolyte injection hole 11.

An insulating sheet 20 was placed on the surface of the lid 3, and an insulating sheet 22 having a slit 21 was placed on the outer surface of the bottom portion of the outer jacket 2. In addition, a PTC element 23 folded twice was placed on the insulating sheet 22. The entire structure including the outer jacket 2 was inserted into the outer tube 24, and the outer tube 24 was thermally shrunk to fix the upper insulating sheet 20 to the lid 3; and the lower insulating sheet 22 and the PTC element 23 to the bottom portion of the outer jacket 2. With this process, the prismatic sealed lithium ion secondary battery having the structure shown in FIGS. 1 and 2 was manufactured.

Comparative Example 1

After a nonaqueous-solvent-based electrolyte was injected into an aluminum outer jacket housing an electrode member as in Example 1, a 1.0 mm thick aluminum (AA alloy number "3003") having a hermetically sealed negative electrode terminal was hermetically joined to the opening portion of the upper end of the outer jacket by caulking through a glass insulating material. With this process, a prismatic sealed lithium ion secondary battery was manufactured.

Figure 8:
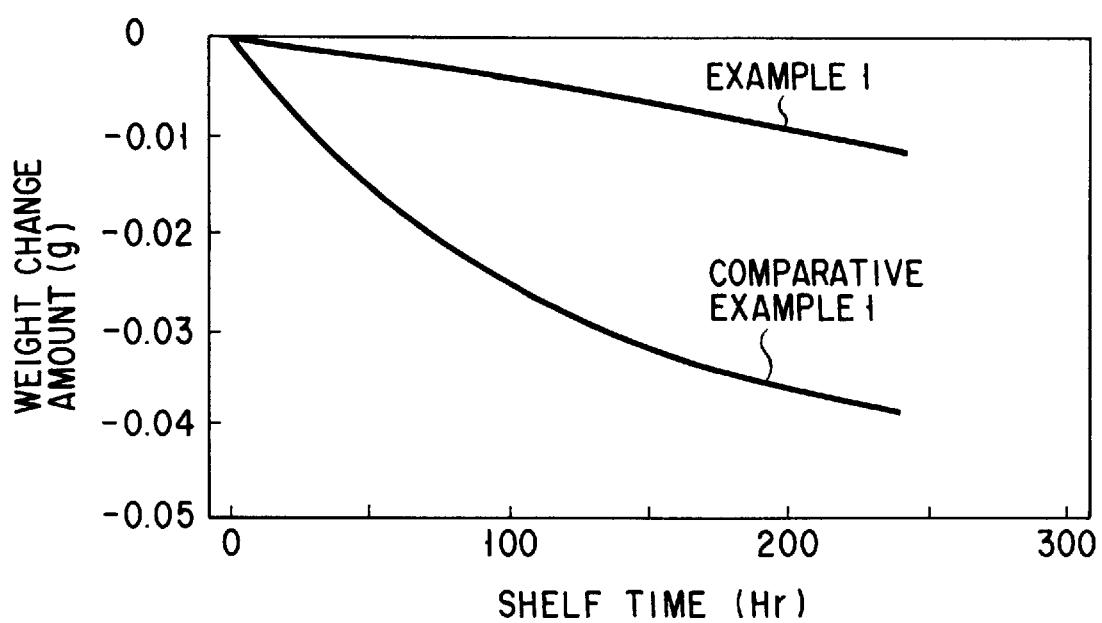
FIG. 8 is a graph showing the relationship between the high-temperature shelf time and the weight change of each of prismatic sealed lithium ion secondary batteries according to the first embodiment of the present invention and comparative example 1.

Changes in the weights of the secondary batteries in Example 1 and Comparative Example 1 were measured while they were left in an 85° C. atmosphere. FIG. 8 shows the measurement results.

As is obvious from FIG. 8, in the secondary battery in Comparative Example 1, in which the lid was fixed to the opening portion of the upper end of the outer jacket by caulking, a slight decrease in weight was caused by leakage of the electrolyte in the high-temperature shelf, revealing that the hermeticity reliability was insufficient. This raised the possibility of causing a deterioration in output characteristics, e.g., a decrease in capacity, owing to a decrease in electrolyte.

According to the secondary battery in Example 1, in which the lid was welded to the opening portion of the upper end of the outer jacket, and the electrolyte injection hole was sealed with the sealing lid by laser welding after the electrolyte was injected through the liquid injection hole in the lid, almost no decrease in weight occurred in the high-temperature shelf. That is, this secondary battery exhibited high hermeticity reliability and had excellent output characteristics owing to the maintenance of capacitance.

EXAMPLE 2

Prismatic sealed lithium ion secondary batteries, each having the structure shown in FIGS. 1 and 2, were manufactured by using outer jackets A and B respectively having the following dimensions by the same method as that of Example 1 except that the minimum radius (R) of the closed loops of weld portions 18 were respectively set to 1.95 mm, 1.75 mm, and 1.45 mm, as shown in FIG. 3, under the following conditions: irradiation energy=6.0 J/pulse; welding time=2.3 s; and overlap ratio=74%.

<Outer jacket A>
  height: 48 mm
  length: 28.6 mm
  width: 8.1 mm
<Outer jacket B>
  height: 48 mm
  length: 29.6 mm
  width: 6.0 mm In this case, "height" is the length from the bottom portion of an outer case 2 to the weld portion on a lid 3, "length" is the length of the long side portion of the outer case 2, and "width" is the length of the short side portion of the outer jacket.

Table 1 shows x- and y-coordinates [P(x, y)] of points $P_1$ to $P_8$ obtained according to FIG. 5 when the minimum radius (R) of the closed loops of the weld portions 18 were respectively set to 1.95 mm, 1.75 mm, and 1.45 mm.

TABLE 1

| Welding Locus Point | Minimum Radius (R) | | |
|---|---|---|---|
| | 1.95 mm | 1.75 mm | 1.45 mm |
| $P_1$ | (−0.65, −3.12) | (−0.58, −2.8) | (−0.48, −2.32) |
| $P_2$ | (0, −2.6) | (0, −2.33) | (0, −1.93) |
| $P_3$ | (1.3, −1.43) | (1.17, −1.28) | (0.97, −1.06) |
| $P_4$ | (1.95, 0) | (1.75, 0) | (1.45, 0) |
| $P_5$ | (0, 1.95) | (0, 1.75) | (0, 1.45) |
| $P_6$ | (−1.95, 0) | (−1.75, 0) | (−1.45, 0) |
| $P_7$ | (−1.3, −1.43) | (−1.17, −1.28) | (−0.97, −1.06) |
| $P_8$ | (0.65, −3.12) | (0.58, −0.28) | (0.48, −0.23) |

Fraction nondefectives in Example 2 were checked. In either of the outer jackets A and B with the weld portions having the closed loops each having a minimum radius (R) of 1.95 mm, the fraction nondefective was 96%. In each of the outer jackets A and B with the weld portions having the closed loops respectively having minimum radius of 1.75 mm and 1.45 mm, the fraction nondefective was 100%.

As is obvious from the above result, the fraction nondefective increases as the closed loop of the weld portion formed by laser welding decreases in length regardless of the volume of the outer case 2. This is because as the minimum radius (R) of the closed loop of the weld portion decreases in length from 1.95 mm to 1.75 mm and 1.45 mm, the weld portion decreases in length 10% and 25%, and the welding heat input to the outer case 2 decreases accordingly, thus preventing the electrolyte from evaporating and escaping from a liquid injection hole 11 through a spacer 9. Note that when the electrolyte escapes, a deterioration in the weld of a sealing lid, weld defects, and formation of pinholes occur.

A short weld portion having a closed loop can be formed by combining arcuated weld portions formed by performing laser welding scanning from start points to end points a plurality of number of times, as shown in FIGS. 4A and 4B, instead of forming a closed loop by continuously performing laser welding scanning from a start portion to an end portion. For example, when the weld portion 18 having the closed loop is formed by using the two arcuated weld portions $18_1$ and $18_2$, as shown in FIG. 4A, the welding heat input per welding process can be reduced about 50%. When the weld portion 18 having the closed loop is formed by using the three arcuated weld portions $18_1$, $18_2$, and $18_3$, as shown in FIG. 4B, the welding heat input can be reduced about 67%. Weld defects due to the escape of the electrolyte can therefore be suppressed by increasing the number of arcuated weld portions for forming a weld portion having a closed loop.

EXAMPLE 3

Prismatic sealed lithium ion secondary batteries were manufactured by the same method as that in Example 1 except that aluminum (AA alloy number "3003") lids each having a surface roughness (Ra) of 3 μm and aluminum (AA alloy number "3003") plate members respectively having thicknesses 0.05 mm, 0.10 mm, 0.15 mm, 0.20 mm, 0.25 mm, and 0.30 mm were used.

Fraction (products free from leakage of an electrolyte and the like) detectives were checked for 100 secondary batteries of each type. Table 2 shows the results.

TABLE 2

| Thickness of Sealing Lid (mm) | 0.05 | 0.10 | 0.15 | 0.20 | 0.25 | 0.30 |
|---|---|---|---|---|---|---|
| Fraction Nondefective (%) | 78 | 100 | 100 | 100 | 99 | 69 |

As is obvious from Table 2, the secondary batteries having the sealing lids having thicknesses of 0.10 to 0.25 mm exhibit very high fraction nondefectives.

As has been described in detail above, according to the present invention, there is provided a highly reliable sealed battery having a structure in which a lid is hermetically joined to the opening portion of the upper end of an outer jacket, and an electrolyte injection hole in the lid is hermetically sealed with a metal sealing lid.

A lighter sealed battery can be realized by forming at least the lid of the lid and the sealing lid by using an aluminum light alloy.

In addition, according to the present invention, there is provided a method of manufacturing, with a high yield, a highly reliable sealed battery having a structure in which a lid is hermetically joined to the opening portion of the upper end of an outer jacket, and an electrolyte injection hole in the lid is hermetically sealed with a metal sealing lid.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery comprising:

a battery case having a structure in which a metal lid is welded to an opening portion of a metal outer jacket;

an electric-power generating element housed in said battery case and having a positive electrode and a negative electrode with a separator being sandwiched therebetween;

an injection hole formed in said battery case to allow an electrolyte to be injected; and a sealing lid made of a metal plate material which is seam-welded to said battery case including said injection hole by a laser beam, wherein said sealing lid has a weld portion formed by the laser beam to have a closed loop surrounding said injection hole to be seam-welded to said battery case, and at least one of start and end points of the weld portion is located outside the closed loop.

2. A battery according to claim 1, wherein said injection hole is formed in said lid of said battery case.

3. A battery according to claim 1, wherein the weld portion having the closed loop is formed by performing laser welding from a start point to an end point so as to draw a closed loop, and at least one of the start and end points of the weld portion is located outside the closed loop.

4. A battery according to claim 1, wherein the weld portion having the closed loop is formed by combining a plurality of arcuated weld portions so as to draw a closed loop, and at least one of start and end points of each of the arcuated weld portions is located outside the closed loop.

5. A battery according to claim 1, wherein the closed loop surrounding said injection hole is formed on said sealing lid such that a minimum radius of the closed loop becomes not more than 1.75 mm.

6. A battery according to claim 1, wherein said sealing lid is spot-welded to said battery case at portions outside the closed loop.

7. A battery according to claim 1, wherein said battery case and said sealing lid are made of an aluminum-based metal.

8. A battery according to claim 7, wherein the aluminum-based metal is a material selected from the group consisting of pure aluminum and an aluminum alloy containing not more than 0.05 wt % of Mg and not more than 0.2 wt % of Cu.

9. A battery according to claim 1, wherein said battery case is made of a plate material having a thickness of not less than 0.8 mm.

10. A battery according to claim 1, wherein said sealing lid is made of a plate material having a thickness of 0.10 mm to 0.25 mm.

11. A method of manufacturing a battery, comprising the steps of:

assembling a battery case by welding a metal lid to an opening portion of a metal outer jacket;

housing an electric-power generating element in said case and said element having a positive electrode and negative electrode with a separator being sandwiched therebetween;

forming an injection hole in said battery case and injecting an electrolyte into said case through said injection hole; and placing a sealing lid made of a metal plate material on an outer surface of said battery case including the injection hole, and seam-welding said sealing lid to said battery case to seal the injection hole, wherein said seam-welding process is performed by forming a weld portion on said sealing lid by a laser beam such that the weld portion has a closed loop surrounding said injection hole and at least one of start and end points of the weld portion is located outside the closed loop.

12. A method according to claim 11, wherein said injection hole is formed in said lid of said battery case.

13. A method according to claim 11, wherein the weld portion having the closed loop is formed by laser welding such that a closed loop surrounding said injection hole is drawn in the process of laser welding from a start point to an end point, and at least one of the start and end points is located outside the closed loop.

14. A method according to claim 11, wherein the weld portion having the closed loop is formed by combining a plurality of arcuated weld portions so as to draw a closed loop surrounding said injection hole, and at least one of start and end points of each of the arcuated weld portions is located outside the closed loop.

15. A battery according to claim 11, wherein the closed loop surrounding said injection hole is formed on said sealing lid such that a minimum radius of the closed loop becomes not more than 1.75 mm.

16. A method according to claim 11, wherein said sealing lid is temporarily fixed to said battery case by performing spot welding at portions of said sealing lid which are located outside the closed loop before the laser welding.

17. A method according to claim 11, wherein said battery case and said sealing lid are made of an aluminum-based metal.

18. A method according to claim 17, wherein the aluminum-based metal is a material selected from the group consisting of pure aluminum and an aluminum alloy containing not more than 0.05 wt % of Mg and not more than 0.2 wt % of Cu.

19. A method according to claim 11, wherein said battery case is made of a plate material having a thickness of not less than 0.8 mm.

20. A method according to claim 11, wherein said sealing lid is made of a plate material having a thickness of 0.10 mm to 0.25 mm.

* * * * *